(12) United States Patent
Gladden

(10) Patent No.: US 6,761,025 B1
(45) Date of Patent: Jul. 13, 2004

(54) ENHANCED AMMONIA FEED CONTROL FOR SELECTIVE CATALYTIC REDUCTION

(75) Inventor: John R. Gladden, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/325,319

(22) Filed: Dec. 19, 2002

(51) Int. Cl.⁷ .................................................. F01N 3/00
(52) U.S. Cl. ............................ 60/286; 60/274; 60/276
(58) Field of Search ........................ 60/274, 286, 295, 60/301, 276

(56) References Cited

U.S. PATENT DOCUMENTS

| | | | |
|---|---|---|---|
| 3,896,616 A | * 7/1975 | Keith et al. | 60/274 |
| 3,961,477 A | 6/1976 | Grieshaber et al. | 60/274 |
| 4,403,473 A | 9/1983 | Gladden | 60/274 |
| 5,120,695 A | 6/1992 | Blumrich et al. | 502/78 |
| 5,201,802 A | * 4/1993 | Hirota et al. | 60/276 |
| 5,224,334 A | 7/1993 | Bell | 60/274 |
| 5,367,875 A | 11/1994 | Aboujaoude et al. | 60/303 |
| 5,369,956 A | * 12/1994 | Daudel et al. | 60/276 |
| 5,431,893 A | 7/1995 | Hug et al. | 423/234.1 |
| 5,461,857 A | 10/1995 | Itou et al. | 60/276 |
| 5,540,047 A | 7/1996 | Dahlheim et al. | 60/274 |
| 5,628,186 A | * 5/1997 | Schmelz | 60/274 |
| 5,746,052 A | 5/1998 | Kinugasa et al. | 60/274 |
| 5,771,686 A | * 6/1998 | Pischinger et al. | 60/274 |
| 5,782,087 A | 7/1998 | Kinugasa et al. | 60/276 |
| 5,785,937 A | 7/1998 | Neufert et al. | 423/213.2 |
| 5,845,487 A | * 12/1998 | Fraenkle et al. | 60/274 |
| 5,976,475 A | 11/1999 | Peter-Hoblyn et al. | 423/212 |
| 6,052,989 A | 4/2000 | McCabe et al. | 60/285 |
| 6,069,013 A | 5/2000 | Plog et al. | 436/113 |
| 6,125,629 A | * 10/2000 | Patchett | 60/286 |
| 6,173,568 B1 | 1/2001 | Zürbig et al. | 60/274 |
| 6,182,444 B1 | * 2/2001 | Fulton et al. | 60/277 |
| 6,269,633 B1 | * 8/2001 | van Nieuwstadt et al. | 60/277 |
| 6,293,097 B1 | * 9/2001 | Wu et al. | 60/286 |
| 6,471,924 B1 | * 10/2002 | Feeley et al. | 423/213.5 |

* cited by examiner

Primary Examiner—Thomas Denion
Assistant Examiner—Diem Tran
(74) Attorney, Agent, or Firm—Todd T Taylor

(57) ABSTRACT

A selective catalytic reduction emissions control system of a compression ignition engine is provided with enhanced ammonia feed control for improved emissions control performance. The reduction agent is provided in two doses, and the reactor is provided with two reacting beds. The second dose of reactant is provided between the first and second reacting beds.

20 Claims, 1 Drawing Sheet

ENHANCED AMMONIA FEED CONTROL FOR SELECTIVE CATALYTIC REDUCTION

TECHNICAL FIELD

The present invention relates generally to emissions control systems for reciprocating engines, and more particularly to an emissions control system for increasing selective catalytic reduction (SCR) efficiency through enhanced reactant feed control.

BACKGROUND

Combustion engines including compression ignition and spark ignition reciprocating engines and gas turbines provide efficient power sources requiring low operating personnel requirements. Combustion engines produce and emit $NO_x$ (nitrogen oxides). Control methods to reduce the $NO_x$ often increase the fuel consumption of the engines and require large increase in the operating personnel required.

Compression ignition engines, such as diesel engines, provide advantages in fuel economy, but produce and emit both $NO_x$ and particulates during normal operation. When primary measures (actions that affect the combustion process itself, such as exhaust gas recirculation and engine timing adjustments) are taken to reduce one, often the other is increased. Thus, combustion conditions selected to reduce pollution from particulates and obtain good fuel economy tend to increase the output of $NO_x$. Current and proposed regulations and legislation present significant challenges to manufacturers to achieve good fuel economy while at the same time reducing the emission levels of particulates and $NO_x$.

In order to meet such requirements or restrictions, a method known as SCR (selective catalytic reduction) has been used for reducing the emission of $NO_x$. The SCR method consists of injecting gaseous ammonia ($NH_3$), ammonia in aqueous solution or aqueous urea, or ammonia supplied from an ammonia generator using a solid source of ammonia such as ammonia carbamate or ammonia carbonate, into the exhaust gas system of the compression ignition engine as a reduction agent. When the temperature of the exhaust gas stream is above a reaction temperature, for example a temperature above 160° C. for aqueous urea, the reduction agent undergoes a hydrolysis process and is decomposed into ammonia and $CO_2$. As the exhaust gas stream is passed through the SCR catalyst, the gaseous ammonia reacts with the $NO_x$ to reduce the $NO_x$ to molecular nitrogen. This reduces or limits the $NO_x$ emissions from the compression ignition engine.

The amount of ammonia required at any given time varies as operating conditions of the engine change, and the exhaust gas content includes more or less $NO_x$. It is important that a sufficient amount of ammonia be supplied to treat $NO_x$ present in the exhaust gas stream, so that $NO_x$ emission standards are achieved. On the other hand, it is wasteful and inefficient to supply ammonia in excess of the amount required to treat the $NO_x$ present in the exhaust gas stream.

U.S. Pat. No. 4,403,473 entitled "Ammonia/Fuel Ratio Control System For Reducing Nitrogen Oxide Emissions", issued Sep. 13, 1983, teaches a method and apparatus for efficiently reducing $NO_x$ emissions from an engine. Ammonia is metered to the exhaust gas conduit in a pre-selected proportion to the fuel mass flow rate, but only in response to the temperature of the exhaust gas stream in the reactor being within a pre-selected temperature range.

While the aforementioned U.S. Pat. No. 4,403,473 provides a reasonably reliable method and apparatus for reducing $NO_x$ emissions, the method and apparatus do not provide feedback control based on the actual effectiveness of the process. It would be advantageous to control ammonia addition to the exhaust gas stream based on the actual effectiveness of the treatment process.

The present invention is directed to overcoming one or more of the problems as set forth above.

SUMMARY OF INVENTION

In one aspect of the present invention, an emissions control system for treating an exhaust gas stream with a reduction agent in an exhaust system of an engine is provided with a first sensor for determining at least one operating condition of the engine; and a control unit connected to the sensor for determining a calculated amount of the reduction agent needed to treat the exhaust gas stream. A reduction agent supply source has a first metering means for supplying a first dose of the reduction agent to the exhaust stream in an amount less than the calculated amount of the reduction agent. A reactor has an inlet receiving the exhaust gas stream with the first dose of reduction agent. A second metering means supplies a second dose of the reduction agent to the exhaust stream.

In another aspect of the invention, an engine is provided with a combustion section including a plurality of combustion chambers; a combustion air system supplying combustion air to the combustion chambers, and an exhaust system receiving exhaust gases from the combustion chambers. The exhaust system includes an exhaust manifold and an exhaust conduit for conducting the exhaust gases in an exhaust gas stream from the engine. An emissions control system includes a reduction agent supply source and a reactor having first and second reacting beds in fluid flow communication with the exhaust conduit. A first sensor and a control unit connected to the first sensor determine a calculated amount of the reduction agent needed for treatment of the exhaust gas stream. A first metering means supplies to the exhaust stream a first dose of reduction agent less than the calculated amount of the reduction agent. A second metering means between the reacting beds supplies a second dose of the reduction agent to the exhaust stream. A second sensor determines a characteristic of the exhaust stream, and the control unit is connected to the second sensor for determining the amount of the second dose of reduction agent.

In still another aspect of the invention, a method for increasing the efficiency of an emissions control system for a compression ignition engine capable of producing an exhaust gas stream to be treated by a reduction agent which is mixed with the exhaust gas stream to convert the exhaust gas is provided with steps of: determining a needed amount of the reduction agent to treat the exhaust gas stream; supplying a first dose of the reduction agent to the exhaust gas stream; reacting the exhaust gas stream with the first dose of reduction agent; supplying a second dose of reduction agent to the exhaust gas stream after reacting the exhaust gas stream with the first dose of reduction agent; and reacting the exhaust gas stream with the second dose of reduction agent.

Other aspects and advantages of the present invention will be apparent to those skilled in the art upon reading the following detailed description in connection with the drawing and appended claims.

BRIEF DESCRIPTION OF THE DRAWINGS

The invention will be better understood and its advantages more apparent from the following detailed description, especially when read in light of the accompanying drawing, wherein.

DETAILED DESCRIPTION

Figure 1:
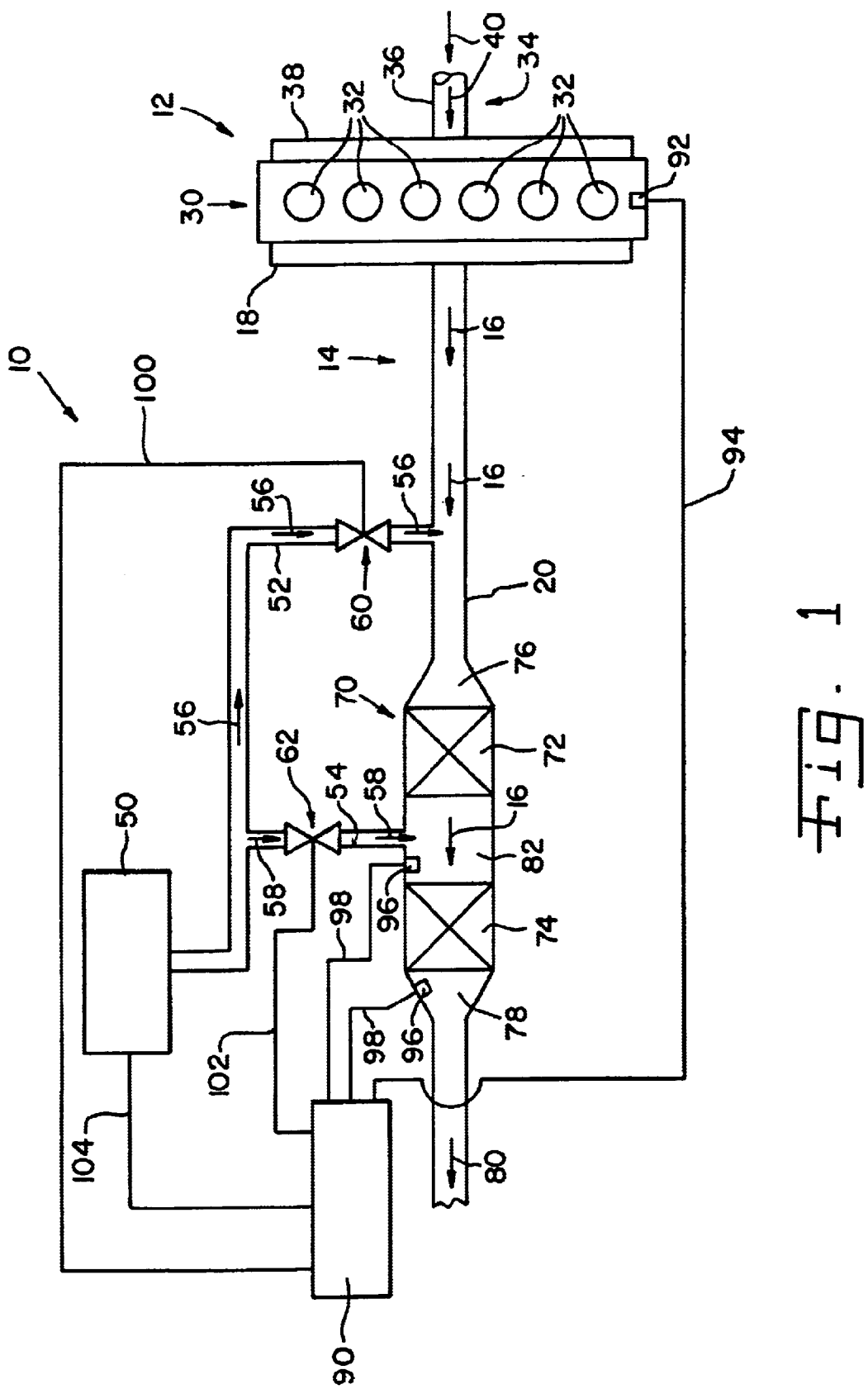
FIG. 1 is a schematic illustration of an engine having enhanced ammonia feed control for selective catalytic reduction, in accordance with the present invention.

Referring now to the drawing, FIG. 1 illustrates an emissions control system 10 constructed and operated according to the present invention. Emissions control system 10 is used to control the emissions from a compression ignition engine 12, such as a diesel engine. Engine 12 includes an exhaust system 14 in which an exhaust gas stream, indicated by arrows 16, is conducted. Exhaust system 14 includes one or more exhaust manifolds 18 and an exhaust conduit 20.

Emissions control system 10 is particularly advantageous in use for diesel engines, but can be used advantageously in all types of reciprocating engines including spark ignited engines, diesel engines, compression ignition and pilot ignition engines. Although engine 12 shown and described herein is a diesel engine, it should be understood that the term "engine" is intended to apply to all types of reciprocating engines, and not limited to diesel engines only. System 10 also can be adapted for use in gas turbines.

Engine 12 further includes a main combustion section 30 which includes, among other elements, an engine block and a cylinder head forming a plurality of combustion chambers 32 therein. A fuel injector, cylinder liner, at least one intake port and corresponding intake valves, at least one exhaust port and corresponding exhaust valves and a reciprocating piston movable within each chamber 32 are provided or associated with each chamber 32. A combustion air system 34, including a combustion air conduit 36 and an intake manifold 38 provide a combustion air stream, indicated by arrows 40, to each combustion chamber 32.

While the present emissions control system 10 is shown and described for use on a heavy duty six cylinder in-line four stroke direct injection diesel engine, numerous other engine types may be used, including two stroke engines. The engine configurations may include in-line and/or v-type engines, as well as various modifications in the number of combustion chambers 32.

Emissions control system 10 includes a reduction agent supply source 50, such as a source for ammonia, urea, or other acceptable reduction agent for processing exhaust gas stream 16. Source 50 may include an ammonia generator system, storage tanks, pumps, valves, piping and controls, as those skilled in the art will understand readily. Supply pipes 52 and 54 from source 50 provide reduction agent to exhaust gas stream 16 in a first dose indicated by arrows 56, and a second dose indicated by arrows 58. First and second doses 56 and 58 are supplied to exhaust gas stream 16 in individually controllable amounts by a first metering means 60 and a second metering means 62, respectively. First metering means 60 and second metering means 62 can be any suitable flow control device, for reliably controlling the rate at which reduction agent in the forms of first dose 56 and second dose 58, respectively, are provided to exhaust gas stream 16. Some examples of suitable devices that can be used for first metering means 60 and second metering means 62 are a controllable valve or other orifice, a nozzle, a pump or the like.

A reactor 70 is provided in flow communication with exhaust conduit 20, and includes a first reacting bed 72 and a second reacting bed 74. First dose 56 of reduction agent is provided to exhaust gas stream 16 in advance of first reacting bed 72, and second dose 58 is supplied to exhaust gas stream 16 between first and second reacting beds 72 and 74. Reactor 70 includes an inlet 76 receiving exhaust gas stream 16, together with first dose 56, and an outlet 78 through which the reacted exhaust gas stream, indicated by arrows 80, passes from reactor 70. An intermediate zone 82 is provided in reactor 70, between first reacting bed 72 and second reacting bed 74.

Emissions control system 10 further includes an electronic control unit 90 that is used to control and monitor various operations and functions of emissions control system 10 and engine 12. Electronic control unit 90 is capable of monitoring various functions of engine 12, by use of one or more sensors 92 that are associated with engine 12. Sensors 92 are connected to electronic control unit 40 via a signal connection 94, which may be an electrically conductive wire. Examples of sensors 92 that may be employed at various locations in engine 12 are an engine speed sensor, an intake manifold air temperature sensor, an intake manifold pressure sensor, various other load, boost and speed sensors, all of which are known to those skilled in the art. Sensor or sensors 92 monitor the operating status of engine 12, providing data signals with regard thereto to control unit 90. Several such sensors 92 can be used to concurrently monitor a number of operating conditions of engine 12, and the various systems associated therewith.

At least one sensor 96 connected to controller 90 by a signal connection 98 is used to determine a condition of exhaust gas stream 16 at some point after first reacting bed 72. Sensor 96 can be one to sense $NO_x$ present in exhaust gas stream 16, or sensor 96 can be one to determine the presence of ammonia in exhaust gas stream 16. Sensor 96 can be positioned in outlet 78 of reactor 70, to provide a signal indicative of the level of ammonia or $NO_x$ remaining in reacted exhaust gas stream 80, after treatment in reactor 70. Sensor 96 also can be positioned in reactor 70, between first and second reacting beds 72 and 74, to determine the presence of ammonia or $NO_x$ between reacting beds 72 and 74. FIG. 1 illustrates two sensors 96, one in each of the aforementioned positions; however, it is not necessary that one sensor 96 be used in each position. A single sensor 96, in either position shown, is adequate in many applications for emission control system 10. Alternatively, different sensors 96 can be used in each position. For example, an ammonia sensor 96, between first reacting bed 72 and second reacting bed 74, can be sued to determine the amount of ammonia still available for reacting with exhaust gas stream 16; and an $NO_x$ sensor 96 can be used associated with outlet 78, to determine the effectiveness of the overall treatment in reactor 70.

Electronic control unit 90 also is connected to first metering means 60 by a control signal connection 100, and to second metering means 62 by a control signal connection 102, to control the operations of first and second metering means 60 and 62. Electronic control unit 90 further is connected to reduction agent supply source 50 by an electrical connection or connections 104, to control the operation of the various valves, pumps and the like associated with reduction agent supply source 50.

Electronic control unit 90, also known as a control module or a controller, and may take many forms, including a computer based system, a microprocessor based system including a microprocessor, a micro-controller, or any other control type circuit or system. Electronic control unit 90 may include memory for storage of a control program for operating and controlling the emissions control system 10 of the present invention, and other memory for temporary storage of information.

Industrial Applicability

The operation of the emissions control system 10 is based on electronic control unit 90 monitoring the status of the engine 12 and the effectiveness of the performance of emissions control system 10, and controlling the supply of reduction agent to exhaust gas stream 16 based thereon.

Combustion air stream 40 in combustion air system 34 is provided to intake manifold 38 from combustion air conduit 36. Fuel and combustion air from intake manifold 38 are provided to each combustion chamber 32 of engine 12, and are combusted therein in known manner. The combustion gases remaining after the combustion stroke in chambers 32 are expelled from chambers 32 to exhaust system 14, first entering exhaust manifold 18. Exhaust gas stream 16 is formed as the combustion gases flow from exhaust manifold 18 to and through exhaust conduit 20. Exhaust gas stream 16 will contain differing amounts of $NO_x$, depending on the operating conditions of engine 12, therefore requiring different amounts of reduction agent for the proper treatment of $NO_x$ contained in exhaust gas stream 16.

Using data from one or more of engine operating condition sensors 92, electronic control unit 90 determines a calculated amount of the reduction agent, such as ammonia or urea, that will be need to treat exhaust gas stream 16. Control unit 90 sends a signal to first metering means 60 and to reduction agent supply source 50, whereby first dose 56 of reduction agent is transported from reduction agent supply source 50 to exhaust gas stream 16, via supply pipe 52 and first metering means 60. First dose 56 includes an amount of the reduction agent which is less than the calculated amount needed to treat exhaust gas stream 16. A statistical approach can be used for calculating first dose 56. One such approach includes determining the accuracy of the $NO_x$ emissions calculation from the parameters monitored, and determining the accuracy of the dosing metering equipment. For example, if the $NO_x$ emission calculation is accurate within seven percent (7%) and the dosage metering equipment has a three percent (3%) accuracy, first dose 56 may be an amount of approximately ninety percent (90%) of the calculated amount. Other statistical approaches to calculating first dose 56 also can be used.

First dose 56 is supplied to exhaust gas stream 16, and travels therewith to first reacting bed 72 in reactor 70. In known manner, the reduction agent of first dose 56 and first reacting bed 72 cause chemical reactions to occur, decreasing the amount of $NO_x$ present in exhaust gas stream 16.

Since first dose 56 includes an amount less than the calculated amount of reduction agent required to treat the $NO_x$ present in exhaust gas stream 16, it is necessary to supply additional reduction agent to complete the treatment of exhaust gas stream 16. Control unit 90 sends a signal to second metering means 62 and to reduction agent supply source 50, whereby second dose 58 of reduction agent is transported from reduction agent supply source 50 to exhaust gas stream 16, via supply pipe 54 and second metering means 62. Second dose 58 includes a remaining amount of the reduction agent necessary to complete the treatment of exhaust gas stream 16. Second dose 58 can be the balance of the calculated amount needed to treat exhaust gas stream 16, not supplied in first dose 56. For example, if first dose 56 included an amount of approximately ninety percent (90%) of the calculated amount, second dose 58 can include an amount of approximately ten percent (10%) of the calculated amount. Thus, together first and second doses 56 and 58 make up one hundred percent (100%) of the calculated amount.

Advantageously, in emissions control system 10 of the present invention, the amount of reduction agent supplied in second dose 58 can be separately determined and varied, to thereby supply an adequate amount of reduction agent, but not an excessive amount of reduction agent for treating exhaust gas stream 16. Processing a signal or signals from one or more sensors 96, control unit 90 determines an amount of reduction agent to be supplied in second dose 58 to complete the treatment of exhaust gas stream 16. By so calculating the amount of second dose 58, the effectiveness of the treatment with first dose 56 in first reacting bed 72 is considered, and if sensor 96 is provided downstream of second reacting bed 74, feedback on the overall effectiveness of the treatment in both reacting beds 72 and 74 is provided. Using feedback from sensor or sensors 96, control unit 90 may determine an amount for second dose 58 such that the combined amount of first dose 56 and second dose 58 is more, or less, than the original calculated amount.

Second dose 58 is supplied to exhaust gas stream 16 between first reacting bed 72 and second reacting bed 74, as exhaust gas stream 16 flows through intermediate zone 82. Exhaust gas stream 16 then flows to second reacting bed 74, together with second dose 58 and any residual amounts of first dose 56. The treatment of $NO_x$ in exhaust gas stream 16 is continued in second reacting bed 74, so that the $NO_x$ levels of reacted exhaust gas stream 80 leaving reactor 70 are at acceptable limits.

Rather than having a single reactor 70 with first reacting bed 72 and second reacting bed 74 therein, two separate reactors, each having a single reacting bed, also could be used. A single reactor 70 with split reacting beds 72 and 74 is believed to be advantageous in its simplicity and reduced space requirements compared to using separate reactors.

The present invention provides a selective catalytic reduction emissions control system for treating an exhaust gas stream from an engine, which has closed feedback control, so that an adequate amount, but not an excessive amount of the reduction agent is provided. Reduction agent is not wasted, and the exhaust gas stream is treated adequately. The efficiency of the process is thereby improved.

Other aspects, objects and advantages of this invention can be obtained from a study of the drawings, the disclosure and the appended claims.

What is claimed is:

1. An emissions control system for treating an exhaust gas stream with a reduction agent in an exhaust system of an engine, the emissions control system comprising:

a first sensor for determining at least one operating condition of the engine;

a control unit connected to the sensor for determining a calculated amount of the reduction agent needed to completely treat the exhaust gas stream;

a reduction agent supply source;

a first metering means for supplying a first dose of the reduction agent to the exhaust stream, said first dose of reduction agent being less than the calculated amount of the reduction agent needed to completely treat the exhaust gas stream;

a reactor having an inlet receiving the exhaust gas stream with the first dose of reduction agent; and a second metering means for supplying a second dose of the reduction agent to the exhaust stream downstream from the reactor inlet.

2. The emissions control system of claim 1, including a second sensor for determining a characteristic of the exhaust gas stream, and said control unit connected to said second sensor for determining the amount of said second dose of reduction agent.

3. The emissions control system of claim 2, said reactor including a first reacting bed and a second reacting bed, and said second sensor and said second metering means disposed between said first and second reacting beds.

4. The emissions control system of claim 3, said first metering means being a flow control device to dispense said first dose in an amount of approximately ninety percent (90%) of said calculated amount of said reduction agent.

5. (Original) The emissions control system of claim 1, said reactor having an outlet, and a second sensor associated with said outlet for sensing the level of $NO_x$ emissions emitted by the reactor, said sensor being connected to said control unit for determining the amount of reduction agent in said second dose.

6. The emissions control system of claim 1, said first sensor being adapted for sensing one of engine speed, fuel consumption rate, boost and load.

7. The emissions control system of claim 1, said reactor including a first reacting bed and a second reacting bed, and said second metering means disposed between said first reacting bed and said second reacting bed.

8. The emissions control system of claim 1, said first dose being approximately ninety percent (90%) of said calculated needed amount of said reduction agent.

9. An engine producing an exhaust gas stream to be treated by a reduction agent which is mixed with the exhaust gas stream to convert the exhaust gas stream, the engine comprising:
   a combustion section including a plurality of combustion chambers;
   a combustion air system supplying combustion air to said combustion chambers, said combustion air system including an intake air manifold and a combustion air conduit for supplying combustion air to said intake manifold,
   an exhaust system receiving exhaust gases from said combustion chambers, said exhaust system including an exhaust manifold and an exhaust conduit for conducting the exhaust gases in an exhaust gas stream from the engine; and
   an emissions control system, including:
     a reduction agent supply source;
     a reactor having first and second reacting beds in fluid flow communication with said exhaust conduit;
     a first sensor and a control unit connected to said first sensor for determining a calculated amount of the reduction agent needed for complete treatment of the exhaust gas stream;
     a first metering means for supplying to the exhaust stream a first dose of reduction agent less than the calculated amount of the reduction agent needed to completely treat the exhaust gas stream;
     a second metering means between said reacting beds for supplying a second dose of the reduction agent to the exhaust stream; and
     a second sensor for determining a characteristic of the exhaust stream, and said control unit connected to said second sensor for determining the amount of said second dose of reduction agent.

10. The engine of claim 9, said first metering means being a flow control device controlled for supplying said first dose in an amount of approximately ninety percent (90%) of said calculated amount.

11. The engine of claim 9, said second sensor disposed between said first and second reacting beds.

12. The engine of claim 9, said second sensor disposed downstream from said second reacting bed.

13. The engine of claim 9, said second sensor being an $NO_x$ sensor.

14. A method for increasing the efficiency of an emissions control system for a compression ignition engine capable of producing an exhaust gas stream to be treated by a reduction agent which is mixed with the exhaust gas stream to convert the exhaust gas, the method comprising steps of:
    determining a needed amount of the reduction agent to completely treat the exhaust gas stream;
    supplying a first dose of the reduction agent to the exhaust gas stream, said first dose being less than the needed amount to completely treat the exhaust gas stream;
    reacting the exhaust gas stream with the first dose of reduction agent; supplying a second dose of reduction agent to the exhaust gas stream after reacting the exhaust gas stream with the first dose of reduction agent; and
    reacting the exhaust gas stream with the second dose of reduction agent.

15. The method of claim 14, including a step of determining an amount of the second dose based on effectiveness of said step of reacting the exhaust gas stream with the first dose.

16. The method of claim 14, including supplying said first dose of the reduction agent in an amount of approximately ninety percent (90%) of the needed amount from said step of determining the needed amount.

17. The method of claim 16, including a step of determining an amount of the second dose based on effectiveness of said step of reacting the exhaust gas stream with the first dose.

18. The method of claim 17, including determining the $NO_x$ content of the exhaust gas stream after said step of reacting the exhaust gas stream with the second dose of reduction agent, and determining the amount of the second dose in response to said determining the $NO_x$ content.

19. The method of claim 17, including determining the $NO_x$ content of the exhaust gas stream between said step of reacting the exhaust gas stream with the first dose of reduction agent and said step of reacting the exhaust gas stream with the second dose of reduction agent, and determining the amount of the second dose in response to said determining the $NO_x$ content.

20. The method of claim 14, said step of determining the needed amount including sensing at least one engine operating condition from the group of engine operating conditions including boost pressure, fuel consumption rate, engine speed and engine load.

* * * * *